United States Patent [19]
Inoue

[11] Patent Number: 5,257,015
[45] Date of Patent: * Oct. 26, 1993

[54] FLAT PANEL DISPLAY CONTROL APPARATUS

[75] Inventor: Akifumi Inoue, Fusso, Japan

[73] Assignee: Kabushiki Kaisha Toshiba, Kawasaki, Japan

[ * ] Notice: The portion of the term of this patent subsequent to May 1, 2007 has been disclaimed.

[21] Appl. No.: 454,453

[22] Filed: Dec. 21, 1989

Related U.S. Application Data

[63] Continuation of Ser. No. 298,852, Jan. 18, 1989, Pat. No. 4,922,237, which is a continuation of Ser. No. 69,216, Jul. 2, 1987, abandoned.

[30] Foreign Application Priority Data

Jul. 3, 1986 [JP] Japan ............................. 61-156596

[51] Int. Cl.$^5$ ............................................. G09G 5/30
[52] U.S. Cl. ............................................. 345/26; 345/3; 345/12
[58] Field of Search ............... 340/701, 703, 723, 735, 340/766, 771, 789, 790, 791, 794

[56] References Cited

U.S. PATENT DOCUMENTS

| | | | |
|---|---|---|---|
| 3,911,418 | 10/1975 | Takeda | 340/703 |
| 4,191,956 | 3/1980 | Groothuis | 340/789 |
| 4,549,172 | 10/1985 | Welk | 340/703 |
| 4,559,614 | 12/1985 | Peek et al. | 340/735 |
| 4,562,450 | 12/1985 | Ellis, Jr. et al. | 340/794 |
| 4,563,677 | 1/1986 | Seiler | 340/735 |
| 4,566,004 | 1/1986 | Emerson | 340/771 |
| 4,566,005 | 1/1986 | Apperley et al. | 340/771 |
| 4,581,612 | 4/1986 | Jones | 340/791 |
| 4,642,628 | 2/1987 | Murata | 340/703 |
| 4,661,808 | 4/1987 | Rector et al. | 340/790 |
| 4,922,237 | 5/1990 | Inoue | 340/723 |

Primary Examiner—Richard Hjerpe
Attorney, Agent, or Firm—Oblon, Spivak, McClelland, Maier & Neustadt

[57] ABSTRACT

There is provided a flat panel display control device which has the compatibility with CRT display and the function of displaying each character with plurality of dots. A flat panel display apparatus incorporating a video memory (3) for storing the character code and the attribute code data, a character generator (6) for generating a character font data correspondent to the said character code, an attribute register (11) for connecting to the said video memory and for latching the said attribute code, and an attribute control means for modifying the attribute code supplied through the said attribute register according to the necessity and for attribute-processing the character font data generated by the said character generator according to the modified data.

10 Claims, 3 Drawing Sheets

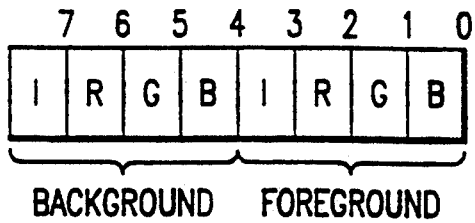
FIG. 3
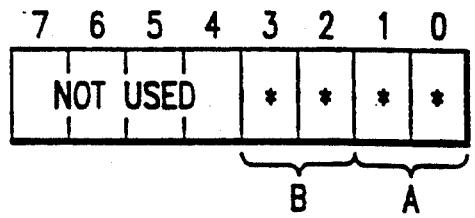
FIG. 4
FIG. 5
| A/B | | OPERATION |
|---|---|---|
| 0 | 0 | BACKGROUND NOT DISPLAYED |
| 0 | 1 | REVERSE (WHITE DOTS ON BLACK BACKGROUND) |
| 1 | 0 | INTENSE (BLACK DOTS ON WHITE BACKGROUND) |
| 1 | 1 | INTENSE REVERSE (WHITE DOTS ON BLACK BACKGROUND) |
FIG. 6

FLAT PANEL DISPLAY CONTROL APPARATUS

This application is a continuation of application Ser. No. 07/298,852, filed Jan. 18, 1989, now U.S. Pat. No. 4,922,237, which is a continuation of application Ser. No. 07/069,216, filed Jul. 2, 1987, now abandoned.

BACKGROUND OF THE INVENTION

The present invention relates to a flat panel display control apparatus and more particularly to an apparatus controlling a flat panel display device which is compatible with a cathode-ray tube (referred to as a CRT hereinafter) display device.

Conventionally, CRT display devices are the most popular as display devices for personal computers. CRT display devices are superior to other display devices in terms of luminance, contrast and the like. However, since CRT display devices are heavy and large in size, they can not be applied to handheld personal computers. Meanwhile, in addition to the CRT display device, flat panel display devices such as a liquid crystal display device (referred to as an LCD hereafter), a plasma display device, an electro luminescent (EL) display device and the like are available. Although they were at first used for relatively compact devices, such as wrist watches, electronic calculators and the like, they can display the same number of dots as the CRT display device in keeping with the trend to enlarged display sizes in recent years. Thus, flat panel display devices are now used for handheld personal computers in place of CRT display devices.

However, in the computer field, it is important to provide software compatibility when a new equipment is developed. When a newly developed computer does not have software compatibility with respect to a conventional computer, new software must be developed. In order to avoid such a need, newly developed computers are generally designed so that conventional computer software can be used.

In the context, the case of a newly developed personal computer with a flat panel desplay device having software compatibility with a conventional personal computer with a CRT display device will be considered. Display for emphasizing display by color is performed by the CRT display device. The flat panel display device can display in only a single color and has no gradation as emphasized display. Accordingly, the video signal of the flat panel display ORs R G B signal generated for CRT display device or ignores the attribute of color set. In these methods, when the color setting is made on both foreground and background, the above distinction becomes impossible to be performed. Furthermore, when the attribute is ignored, these methods contains the defect of incapability of blink or inversion. Therefore, even if a personal computer with a flat panel display device having software compatibility with a personal computer with a CRT display device were to be developed, such compatibility could not provide color display as an emphasized display. Since the current personal computer with a CRT display device frequently utilizes color display, if such display can not be used in a personal computer with a flat panel display device, the corresponding portion would not be displayed resulting in inconvenience and thereby impairing practical use.

SUMMARY OF THE INVENTION

An object of the present invention to provide a flat panel display control apparatus which can realize a color display mode inherent in a CRT display device in a different mode in a flat panel display device and can realize compatibility between a flat panel display and a CRT display device.

The other object of the invention is to provide a flat panel display control apparatus which can make display without any trouble on the flat panel display device of which application software for color CRT has no gray scale displaying function.

In order to realize the above object of the present invention, there is provided a flat panel display control apparatus comprising video memory for storing character code and its attribute code data, character generator for connecting the said video memory and for latching said attribute code, and attribute control means for modifying the attribute code supplied through the said attribute register according to the necessity and for attribute-processing the character font data generated by the said character generator according to the modified results.

BRIEF DESCRIPTION OF THE DRAWINGS

FIG. 3 is a drawing showing attribute codes and data formats.

FIG. 4 is a drawing showing the classification of attribute.

FIG. 5 is a drawing showing the data format of attribute correction data supplied by CPU.

FIG. 6 is a drawing showing the example for processing the classifications A and B shown in FIG. 5.

DETAILED DESCRIPTION OF THE PREFERRED EMBODIMENT

Figure 1:
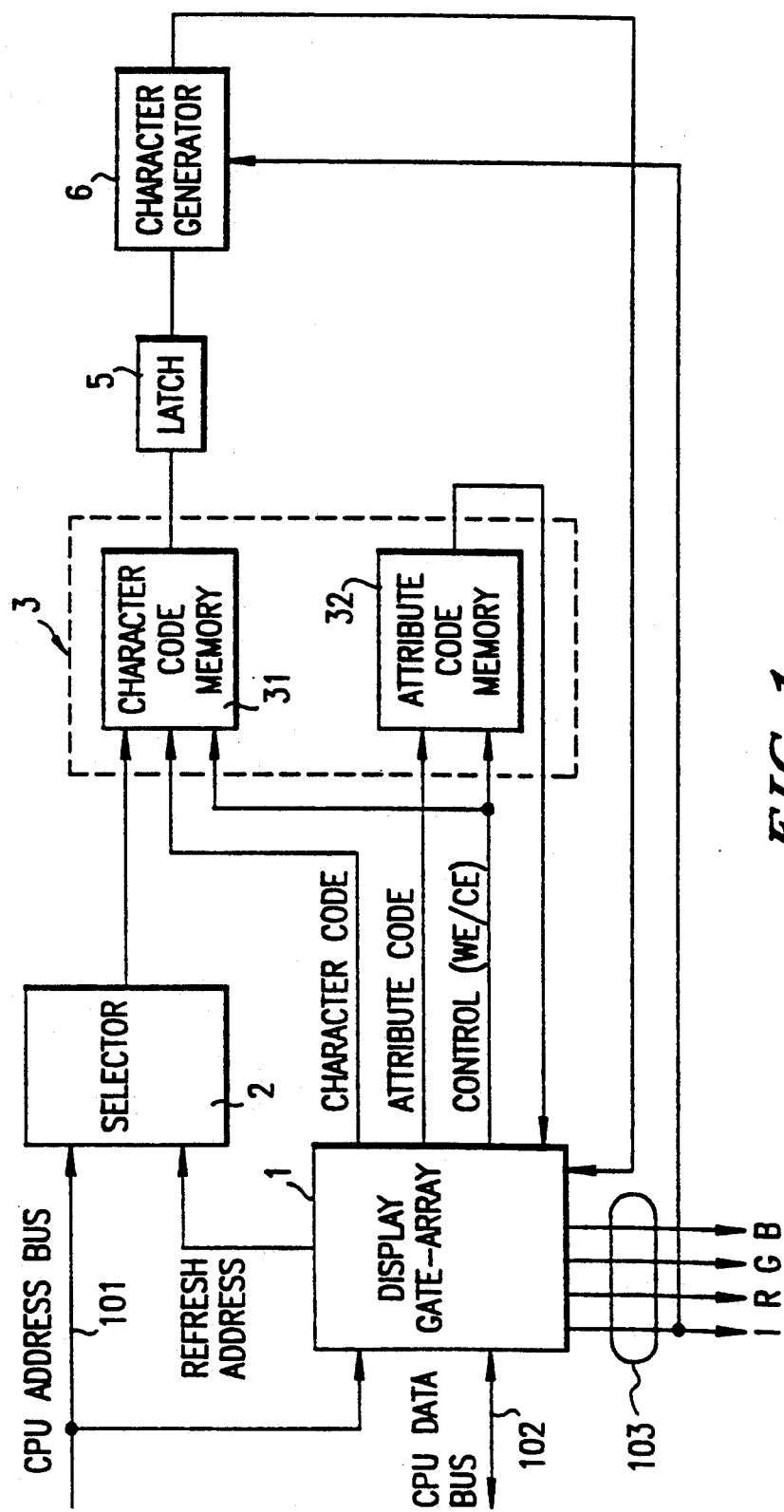
FIG. 1 is a block diagram showing a flat panel display control apparatus according to the embodiment of the present invention.

A flat panel display control apparatus according to an embodiment of the present invention will be described with reference to the accompanying drawings. FIG. 1 is a block diagram showing an arrangement of the one embodiment according to the present invention. The display gate-array 1 between a CPU (not shown) and a display device (not shown) performs the read/write control of video memory and the timing control of display device The display gate-array 1 is connected to the CPU through the address bus 101 and the data bus 102. The selector 2 receives the refresh address signal for the address signal supplied from the CPU through the address bus 101 and for the display supplied from the display gate-array 1. The selector 2 selects one side of the address signals received according to the display timing signal generated by the display gate-array 1, and supplies the selected signal to the video memory 3.

The video memory 3 is composed of the character code memory 31 stored with the character code, and the attribute memory 32 stored with the attribute code. Other than the selector 2 output, the character code supplied by the CPU through the display gate-array 1 is input to the character code memory 31, and to the attribute memory 32, the attribute code is supplied as an input. Furthermore, to the said character code memory 31 and attribute code memory 32, the control signal (WE/CE) for the memory access from the display gate-array 1 are commonly supplied. The said character code memory 31 output is supplied to the character generator 6 through the latch 5. The output converted to the character pattern by the character generator 6 is fed back to the display gate-array 1. The display gate-array 1 performs display attribute control and supplies the result to the display device through the output line 103.

Figure 2:
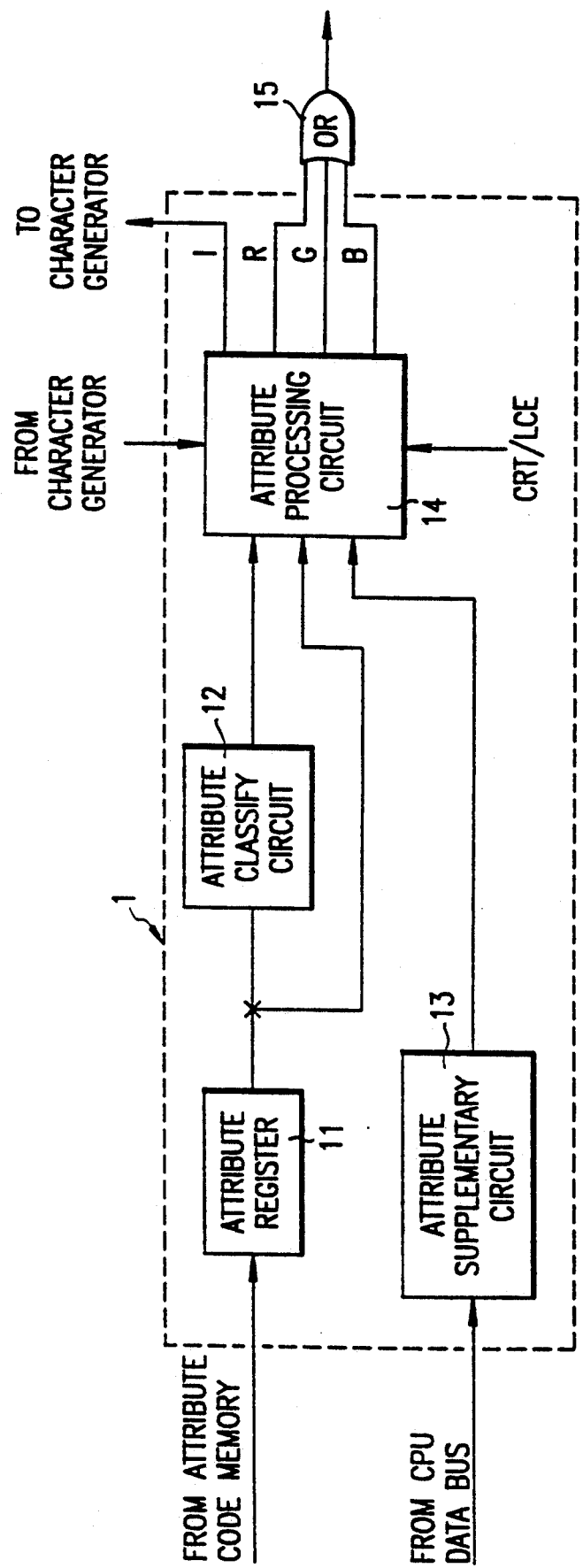
FIG. 2 is detailed block diagram showing a display gate-array shown in FIG. 1.

FIG. 2 is a detailed block diagram of a portion of the display gate-array 1 which relates to display attribute control. The components not directly associated with the present invention are partially omitted.

The attribute code which is read from the attribute code memory 32 is latched in the attribute register 11. The bit assign of the attribute code is shown in FIG. 3. The attribute register 11 output is supplied to the attribute classifying circuit 12 and the attribute processing circuit 14. The attribute classifying circuit 12 classifies the status of color set of the foreground and the background among the display attributes, which are set at the said attribute register 11, into the optional categories and supplies them to the attribute processing circuit 14. The attribute supplementary circuit 13 receives the supplementary data of the display attribute from the CPU through the data bus 102, and supplies the data to the attribute processing circuit 14. The attribute processing circuit 14 performs the attribute control appropriate to the type (CRT/LCD) of the display device connected to the system according to each data which is output for the attribute control from the said attribute register 11, the attribute classifying circuit 12 and the attribute supplementary circuit 13. The R G B signal which is output from the attribute processing circuit 14 is supplied to the OR gate 15 and I signal is supplied to the character generator 6. The OR gate 15 composes the said R G B signal and generates the display data for the flat panel display.

FIG. 4 through FIG. 6 are the drawings cited for explaining the operation of the embodiment, and each drawing is for showing the attributive classification in table form, the bit assign of the attribute supplementary data supplied from the CPU and the example of processing against the classifications A and B.

The operation of the embodiment will be described hereinafter. The CPU reads the character code and the attribute code from the video memory 3. The bit assign of the attribute code are arranged so as to make the color setting respectively to the foreground and the background as shown in FIG. 3. The attribute code is supplied to the attribute classifying circuit 12 and the attribute processing circuit 14 through the attribute register. The classification of the attribution is arranged into the colors of A and B as shown in the table of FIG. 4.

A means the attribution of which foreground color is to be other than the white color and background color is to be assigned to be black (referred to as an "Color on Black" hereinafter). B means the attribution of which colors of the foreground and the background are to be assigned to be different (referred to as an "Color on Color" hereinafter). This classification is performed by the attribute classifying circuit 12 and more specifically by a gate circuit (not shown) within the attribute classifying circuit. The attribute supplementary circuit 13 contains the register (not shown) capable of being rewritten voluntarily by the software stationed in the operating system (OS). FIG. 5 shows the bit assign. As clearly shown in the figure, this register has the bit respectively correspondent to the attribute classification A or B. The attribute processing circuit 14 executes the attribute conversion shown in the table of FIG. 6 according to the classify data which is output from the said attribute classify circuit 12 and the supplementary data which is output from the attribute supplementary circuit. The attribute conversion of the classes A and B is executed as shown in FIG. 6.

When the supplementary data is "00", the background assign bit of the attribute code is inhibited, only the foreground is displayed and the background is not displayed. When the supplementary data is "01", the foreground assign bit of the attribute data is inhibited, and the reverse display is performed by assigning the color of the background. When the supplementary data is "10", the background assign bit among the attribute codes is inhibited and the intensity display is executed by means of assigning the color of the background. The intensity display in the flat panel display is to be performed so as to read the font different from the usual one from the character generator 6, and to display it in the other format on the flat panel display. When the supplementary data is "11", the intense assign of the foreground is made, the color assign bit is inhibited and the color assign is made on the background to make the intense reverse displayed.

The attribute processing circuit 14 generates the color signal (RGB) through the attribute data converted as described above and the character pattern supplied from the character generator 6. By means of acquiring the attribute processing circuit through the OR circuit 15, the video signal for the panel display is generated.

What is claimed is:

1. A display control apparatus for converting a CRT display signal to a flat panel display signal, comprising:
   a video memory for storing character codes and associated attribute code data relating to a color CRT display;
   a character generator connected to the video memory and for generating a character font data correspondent to the character code;
   an attribute control means for providing an output signal for a flat panel display from the output of the character generator under the control of said attribute code data, said attribute control means including a means for checking the attribute code data supplied through said video memory and modifying the attribute code data if color assigned state of the foreground and the background among the displayed attributes latched on said video memory fulfill a predetermined requirement, and producing said output signal on the basis of the modified attribute data.

2. A display control apparatus for converting a CRT display output signal to a flat panel display output signal, comprising:
   a video memory for storing character codes and associated attribute code data relating to a color CRT display;
   a character generator connected to the video memory and for generating a character font data correspondent to the character code;
   an attribute control means for providing an output signal for a flat panel display from the output of the character generator under the control of said attribute code data, said attribute control means including:

a means for checking the attribute code data supplied through said video memory and modifying the attribute code data if color assigned state of the foreground and the background among the displayed attributes latched on said video memory fulfill a predetermined requirement, and producing said output signal on the basis of the modified attribute data;

an attribute register connected to the video memory and storing the character code;

an attribute classify means for classifying color assigned state of the foreground and the background among the displayed attributes latched on said attribute register into categories;

an attribute supplementary means for setting the data according to the necessity for externally changing the displayed attribute previously assigned; and an attribute-processing means for attribute-processing the character font which is output from said character generator according to the supplementary data which is output from the attribute supplementary means and the classified data which is output from the attribute classifying means and for generating said output signal;

wherein said means for checking includes said attribute classifying means and said attribute-processing means.

3. A display control apparatus according to claim 2 in which the said attribute classify means is composed of a gate circuit which extracts the code, in which the color is assigned to the foreground and the black to the background, among the attribute codes latched in said attribute register.

4. A display control apparatus according to claim 2 in which the said attribute classify means is composed of a gate circuit for extracting the code assigned by the color different dependent on the foreground and the background among the attribute codes latched on said attribute register.

5. A display control apparatus according to claim 2, in which said attribute supplementary means has a register capable of being rewritten by software.

6. A display control apparatus according to claim 5 in which to said register the bits correspondent to the category classified by said attribute classify means are assigned, and said attribute processing means recognize this bit to carry out the appropriate attribute-processing.

7. A display control apparatus according to claim 6 in which said attribute processing means executes the reverse operation of the character font which is output from said character generator according to the data which is set by said register.

8. A display control apparatus according to claim 6 in which said attribute processing means carry out the intense processing of the character font which is output from said character generator according to the data which is set to said register.

9. A display control apparatus according to claim 6 in which said attribute processing means carry out both the reverse and intense operations of the character font which is output from said character generator according to the data which is set to said register.

10. A display control apparatus according to claim 8 in which the intense operation executed by said attribute processing means reads the font different from the font which is read from said character generator and makes display in the form different from usual.

* * * * *